United States Patent [19]

Mojden et al.

[11] Patent Number: 4,592,462

[45] Date of Patent: Jun. 3, 1986

[54] CAROUSEL TYPE FEEDER FOR CARTON BLANKS

[75] Inventors: Wallace W. Mojden, Hinsdale; Robert E. Darr, Chicago, both of Ill.

[73] Assignee: Fleetwood Systems, Inc., Countryside, Ill.

[21] Appl. No.: 504,573

[22] Filed: Jun. 15, 1983

[51] Int. Cl.[4] ............................................. B65G 43/08
[52] U.S. Cl. .................................. 198/464.2; 198/532; 198/468.9; 221/11; 414/115
[58] Field of Search ............... 198/469, 470, 485, 486, 198/484, 560, 532; 221/11, 104; 271/DIG. 10, 293, 18; 414/112, 113, 115, 125; 53/541

[56] References Cited

U.S. PATENT DOCUMENTS

| | | | |
|---|---|---|---|
| 2,897,949 | 5/1954 | Hvisking | 198/422 |
| 3,077,287 | 2/1963 | White | 221/11 |
| 3,340,992 | 9/1967 | Seragnoli | 198/485 |
| 3,722,741 | 3/1973 | Mojden | 221/11 |
| 4,000,709 | 1/1977 | Mojden | 113/114 BG |

FOREIGN PATENT DOCUMENTS 3030460  3/1981  Fed. Rep. of Germany ...... 198/422

Primary Examiner—Joseph E. Valenza
Assistant Examiner—Michael Stone
Attorney, Agent, or Firm—Trexler, Bushnell & Wolters, Ltd.

[57] ABSTRACT

An article infeed unit includes a plurality of carrier pocket devices movable to and away from an article delivery station, and a confronting receiver pocket is mounted at the delivery station. The receiver pocket has upstanding sides, and the sides are partly defined by vertical margins confronting the carrier pocket. On demand, a spreader cam operates to spread the receiver pocket side margins apart from one another, so as to accommodate passage of the articles from the carrier pocket into the receiving pocket. At the bottom of the receiving pocket, a base plate is inserted, and the inserted articles rest upon this base member. After the spreader cam is withdrawn, the receiver pocket sides close around the articles. Thereafter, the base plate is withdrawn, and the received articles to descend through the receiver pocket toward a processing device.

10 Claims, 6 Drawing Figures

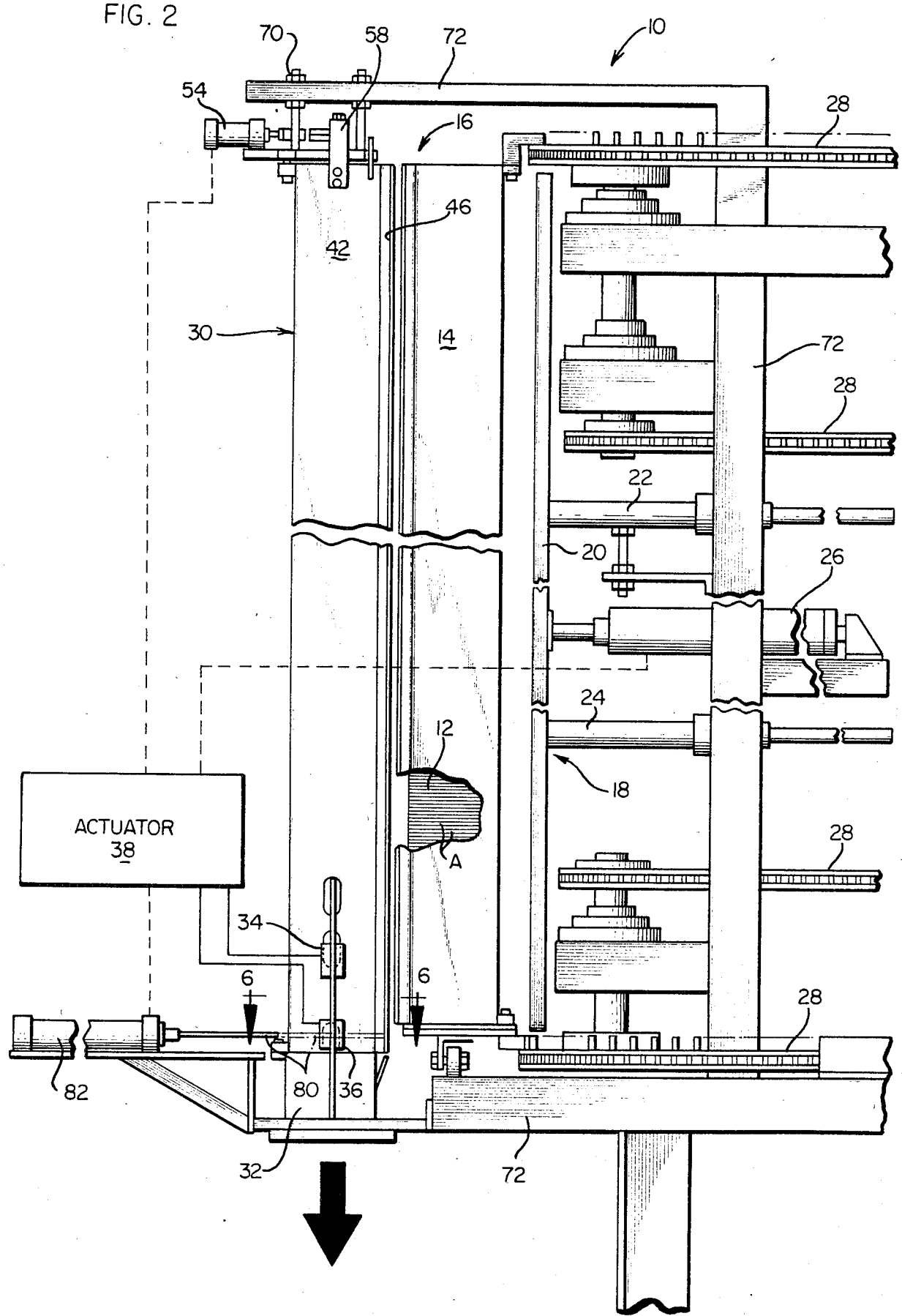

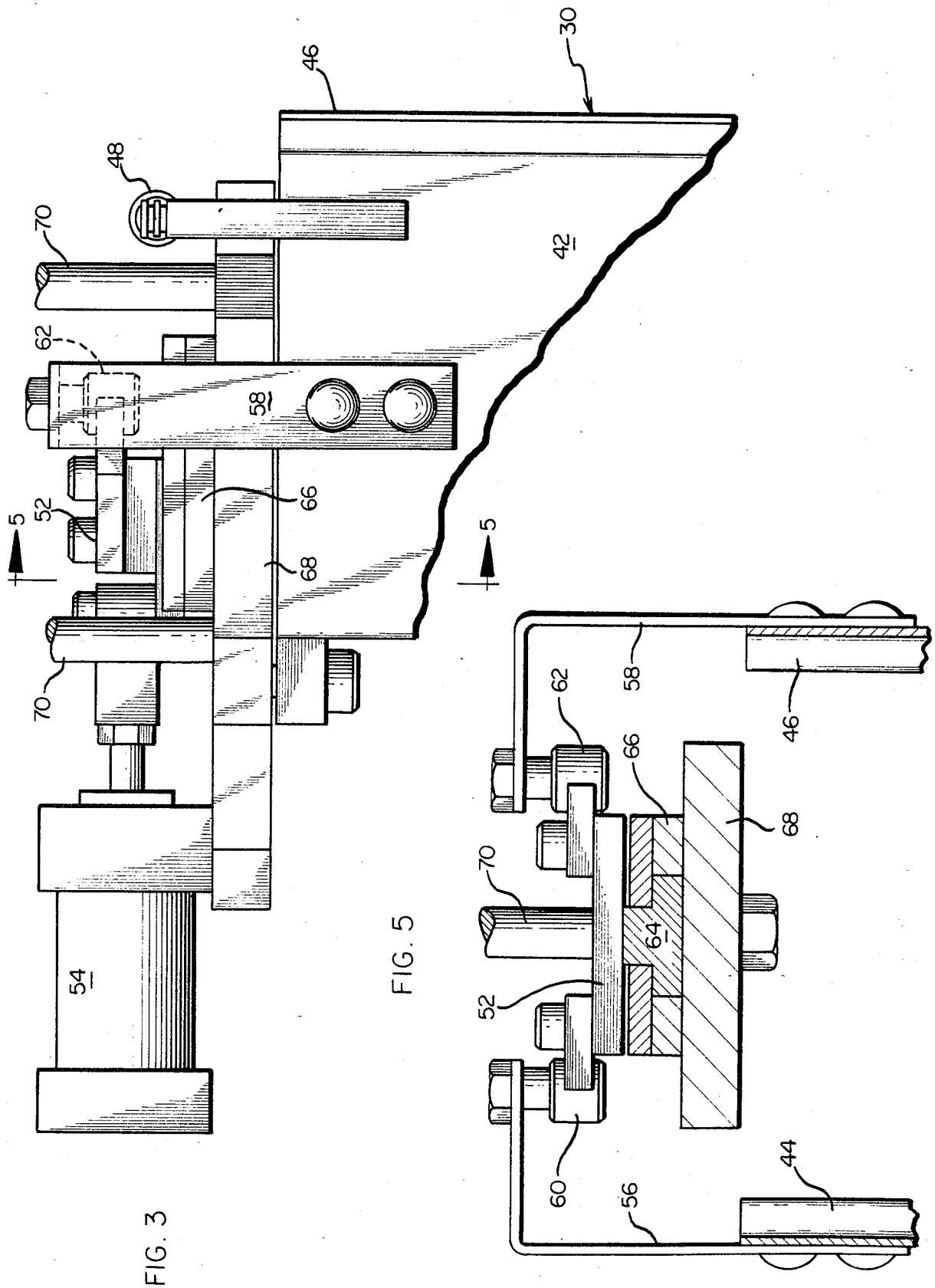

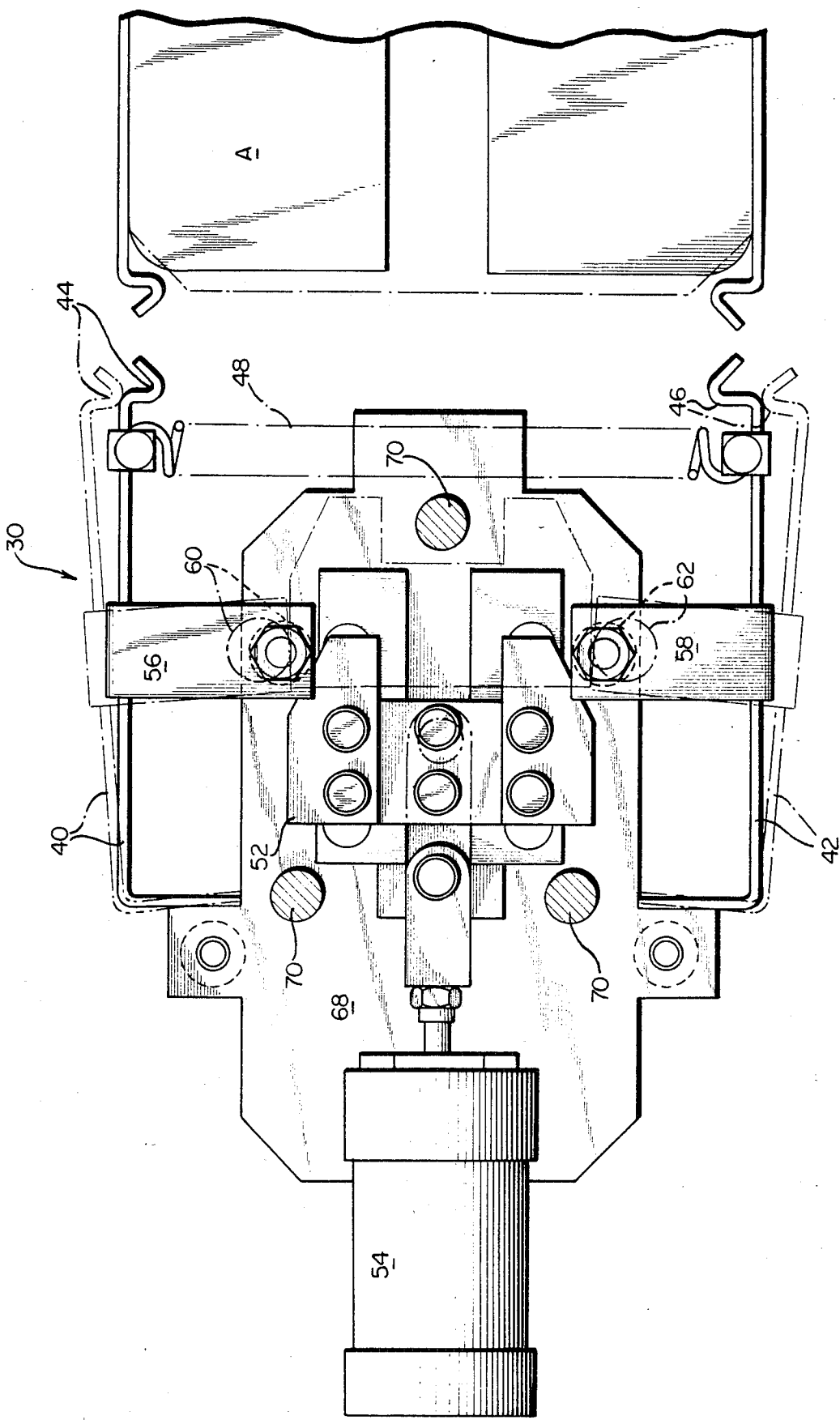

CAROUSEL TYPE FEEDER FOR CARTON BLANKS

BACKGROUND OF THE INVENTION

This invention relates generally to apparatus for infeeding or providing a continuous supply of articles to a processing device.

Modern fabricating or processing equipment often operates at relatively high rates of speed in order to attain commercially economical production costs. To operate at these speeds, the processing equipment must be provided with an effectively endless supply of articles to be processed. Specialized equipment, sometimes called feeding or infeeding equipment, has been devised to meet this need. Infeeders which have been found commercially attractive are described and claimed in U.S. Pat. Nos. 3,722,741 and 4,000,709.

Those infeeders are shown and described as presenting supplies of can ends for attachment to a can body. However, the equipment can be easily adapted to handle a wide array of products or parts such as metal, plastic or paperboard lids, tubs, stampings, or box flats. With the adoption of the infeed units as shown in the above mentioned patents for use with carton blanks, certain problems were encountered. Initially, the processing machines for the blanks will not function with blanks where the edges have become damaged viz., bent or frayed, during transfer from the infeed apparatus to the receiving pocket of the supply means for the processing machine. Damage of this type can occur for a number of reasons, including blank edge impact against the receiving pocket. The present invention provides means to open the receiving pocket thereby eliminating the likelihood of damage to the blanks. Secondly, the processing machine will utilize blanks at an extremely high rate, between 1000 and 2500 blanks per minute. As such, during transfer of a stack of blanks, the level of the blanks at the receiving station may fall well below the new stack being introduced for supply thus creating a gap through which the new stack must drop. The larger this gap, the greater the risk that the lowermost blanks may become disoriented during movement through this gap. A second feature of the present invention involves means for assuring a smooth drop of the newly introduced stacks of blanks for integration with the blanks in the supply means.

In general terms, an infeeder is arranged to provide a number of carrier pocket devices which can be moved endlessly to and away from an article delivery station. Stacks of articles to be processed, such as can ends or box flats, can be manually or otherwise placed in the carrier pockets. This emplacement can be accomplished by a single employee who attends and services a number of processing lines and infeed units. The filled carrier members are indexed to a delivery station, where an ejector mechanism transfers the article stack from the carrier pocket to a confronting receiver pocket. The receiver pocket is connected to an intake structure for a downstream processing machine.

DESCRIPTION OF THE DRAWINGS

FIG. 2 is an elevational view of the infeeder showing the supply apparatus or infeed unit equipped with the present invention;

FIG. 3 is an enlarged fragmentary elevational view of an upper portion of the unit shown in FIG. 2 and showing the receiver pocket opening mechanism and associated structure;

FIG. 4 is a fragmentary plan view showing, in further detail, the receiver pocket opening mechanism and associated structure;

FIG. 5 is a fragmentary sectional view taken substantially in the plane of line 5—5 in FIG. 3.

DETAILED DESCRIPTION

While the invention will be described in connection with a preferred embodiment and procedure, it will be understood that it is not intended to limit the invention to this embodiment or procedure. On the contrary, it is intended to cover all alternatives, modifications and equivalents as may be included within the spirit and scope of the invention as defined by the appended claims.

Figure 1:
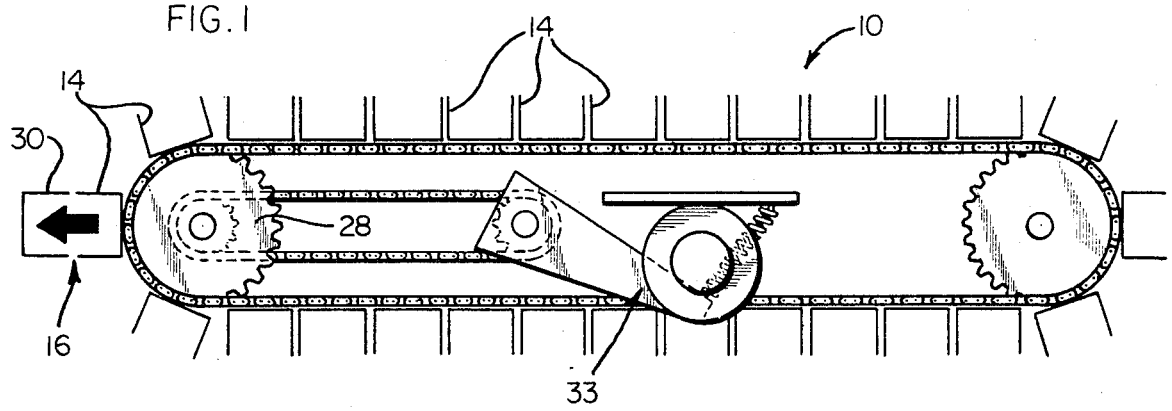
FIG. 1 is a top plan view of an infeeder.

Turning more specifically to FIGS. 1 and 2, there is illustrated a carousel-type infeed unit 10, constructed in accordance with the present invention. In general terms, this machine receives and stores stacks 12 of articles A, such as box flats or can ends, in movable carrier pockets 14. On demand, these full carrier pockets are indexed to an article delivery station 16. At this station 16, the stacks 12 of articles A are forced out of the carrier pocket, as by an ejector mechanism 18. Here, this ejector mechanism 18 includes a vertically oriented rod 20 mounted on guides 22, 24, and reciprocably operated by a fluid power cylinder 26, which can be an air cylinder. The carrier pockets 14 are moved along an endless track by an endless chain mechanism 28, as more particularly explained in U.S. Pat. No. 4,000,709.

A receiver pocket 30 is mounted at the delivery station 16. Articles pushed into the pocket 30 by the ejector mechanism 18 are routed by intake apparatus 32 to a processing machine (not shown). Immediately after a stack 12 of articles has been delivered to the receiver pocket 30, the drive mechanism for the pockets is activated to move the next full carrier pocket 14 into alignment with the receiver pocket 30 at delivery station 16. The aforementioned drive mechanism is conventional, and is designated generally by reference character 33, FIG. 1. As the stack 12 of articles in the receiver pocket falls below a pre-selected level, sensors 34 and 36 sense the absence of articles. A connected actuator 38 of known design will energize the ejector mechanism 18 to transfer a stack of articles 12 from a carrier pocket 14 to the receiver pocket 30. The sensors 34 and 36 operate in conjunction with actuator 38 and ejector mechanism 18, so that transfer does not occur until the level of the stack 12 of articles being fed to the processing machine has dropped below the level of the support surface of the carrier pocket 14. The rate of utilization of blanks by the processing machine (not shown) is extremely high, often in excess of 1000-2500 blanks per minute. Accordingly, under normal operating circumstances, the level of articles in the receiver pocket will have fallen to a point in the intake apparatus 32 below the level of the carrier pocket 14 by the time the ejector mechanism 18 operates to push the next stack 12 of articles into the receiver pocket. In this way, an endless supply of articles is maintained in the intake mechanism 32.

It will be noted in FIGS. 3, 4 and 5 that the receiver pocket 30 is at least partly defined by upstanding side walls 40, 42 which are shaped to retain the received articles. The side walls 40, 42 terminate at vertical margins 44, 46 located at the front of the receiver pocket 30, which confront the delivery or carrier pocket 14. Normally, these side walls are biased toward one another, as by a spring 48, and the margins 44, 46 are urged into a closed, article-retaining condition.

In accordance with one aspect of the invention, the receiver pocket sides 40, 42 are positively opened when the sensors 34, 36 sense the absence of articles in the receiving pocket 30. Here, this positive opening is accomplished by a spreader mechanism, shown in FIGS. 2-5. This spreader means 50 includes a reciprocable cam device 52 which is retracted and extended by a fluid cylinder 54. Upstanding legs 56, 58 mounted on the receiver pocket sides 40, 42 are provided with depending cam rollers 60, 62 positioned for engagement by the extending spreader cam 52. As the spreader cam 52 extends, the cam rollers 60, 62 are engaged, and the receiver pocket sides 40, 42 are spread apart against the action of the spring 48, thereby opening the front receiver pocket margins 44, 46 to permit unimpeded delivery of articles A into the receiver pocket 30.

Motion of the spreader cam 52 is closely guided by guideways 64, 66. The spreader cam guide 64 slides along the fixed guide 66; and the fixed guide 66 is mounted to a stationary base 68 suspended by bolts 70 or other convenient means from a portion of the infeeder frame 72.

Figure 6:
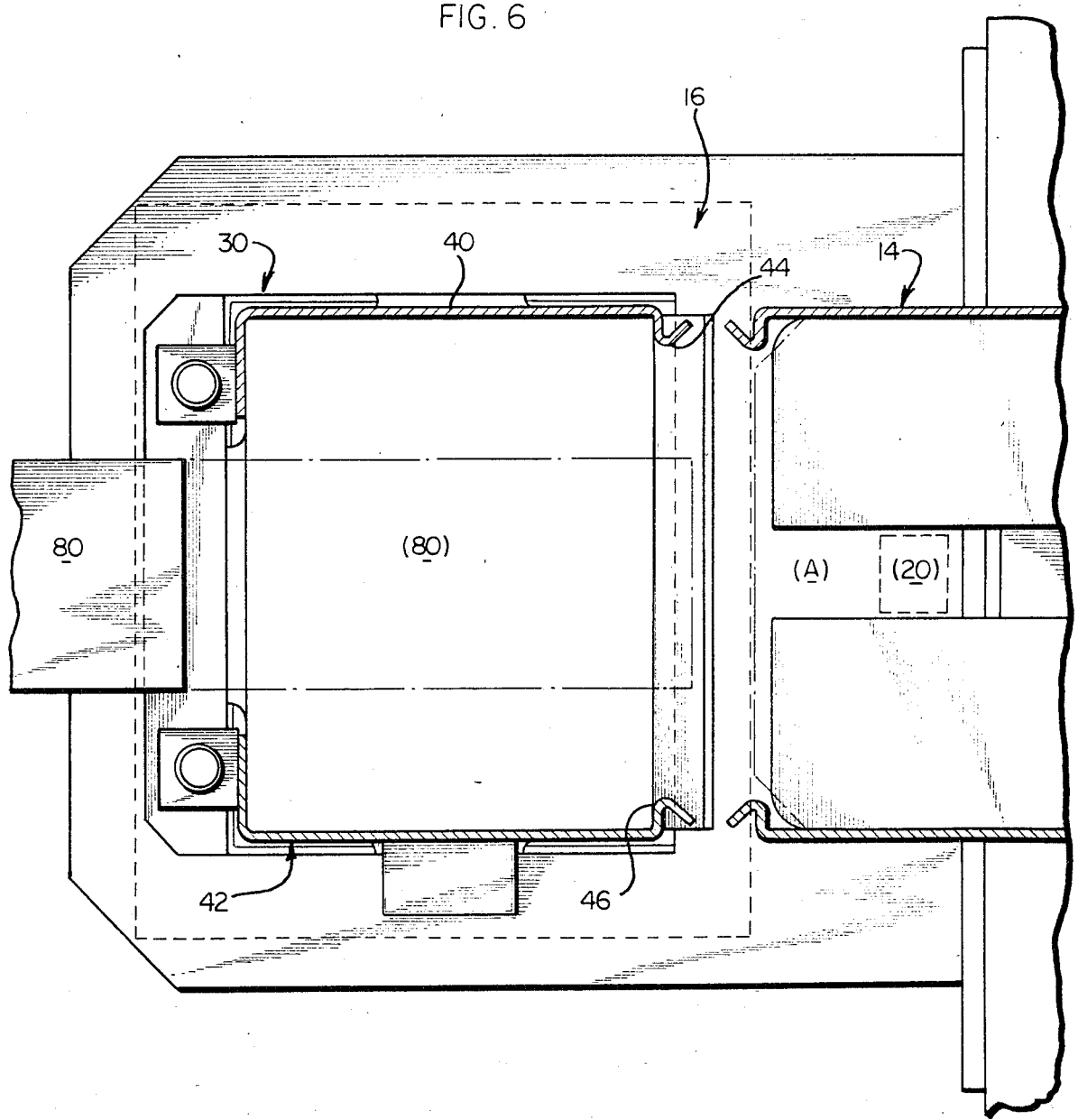
FIG. 6 is a fragmentary sectional view taken substantially in the plane of line 6—6 in FIG. 2.

In accordance with another aspect of the invention, a base support member is temporarily inserted at the bottom of the receiver pocket 30 when box flats or other articles A are being pushed horizontally into the pocket 30. This inhibits the bottom article A from falling through any gap that may exist between the newly delivered stack of articles A, and those in the intake means 32 leading to the processing machine. As discussed above, if this gap is excessive a danger exists that the blank or box flat may twist and become disoriented or may be damaged. Here, the base member takes the form of a plate 80 insertable into and retractable from the pocket by a fluid cylinder 82 (FIG. 6). The extended base means 80 serves to support the entire stack 12 of articles A as they are transferred horizontally into the receiver pocket 30. When the articles A have been firmly seated in the pocket 30, and after the pocket sides 40, 42 have closed, the base plate 80 is retracted, and thus the stack 12 of articles A can drop as a unit a short distance to rest atop the previously received articles for movement into and through the intake mechanism 32. The dropping of the newly introduced stack as unit assures that the articles fall through any existing gap without twisting or otherwise becoming disoriented. As shown in FIG. 2, this plate movement is here caused by an air cylinder 82 mounted to the frame 72 of the infeeder 10.

As can be envisioned, the spreader cam 52 and plate 80 are inserted into the receiver pocket 30 when a new stack 12 of articles A are to be delivered. More specifically, when the sensors 34 and 36 sense the absence of articles in the lower portion of the receiver pocket 30, a delivery pocket 14 carrying a stack 12 of articles A is brought to the delivery station 16. The actuator 38 then operates the top air cylinder 54 and spreader cam 52 to open the receiver pocket sides 40 and 42. The actuator 38 also operates the bottom cylinder 82 to insert the plate 80 into the bottom of the just-emptied receiver pocket 30.

The ejector bar cylinder 26 is then operated to drive the ejector bar 20 forward and urge the article stack 12 horizontally from the delivery pocket 14 into the open receiver pocket 30. The ejector bar 20 is then withdrawn.

The top air cylinder 30 is then reversely operated to withdraw the spreader cam 52, thereby permitting the spring 48 to close the receiver pocket walls 40, 42 around the article A. Thereafter, the bottom air cylinder 82 is reversely operated to withdraw the plate 80 and permit the received stack 12 of articles A to drop a short distance atop the articles A moving through the intake mechanism 32.

The unit as shown in the drawings and hereinabove described is illustrative of but one form or embodiment of the present invention, and it is envisioned that various changes in the structure, or alternate sequences of operation from those described, will no doubt occur to those skilled in the art; as such, said changes or modifications are to be understood as forming part of the present invention insofar as they fall within the spirit and scope of the claims appended hereto.

The invention is claimed as follows:

1. In an apparatus for supplying box flats or like articles to a processing device, the apparatus comprising a plurality of carrier pocket devices movable to and away from an article delivery station, and receiver pocket means at the article delivery station, the receiver pocket means including elongate upstanding side support members for retaining received articles, the side support members being at least partly defined by margins confronting a carrier pocket device located at the delivery station, the improvement comprising spreader means for moving the elongate side support members laterally of the receiver pocket means and away from each other thereby spreading the side support members apart from one another to facilitate delivery of articles from the carrier pocket device to the receiver pocket means and to prevent damage to the articles during entry into said receiver pocket means.

2. The improvement according to claim 1 wherein said spreader means includes retractable and extensible cam means for engaging the receiving pocket side means.

3. The improvement according to claim 1 wherein said spreader means includes leg members attached to opposite sides of said receiver pocket side means, said leg members including cam follower means for engaging said spreader cam means.

4. The improvement according to claim 3 wherein said leg members includes leg elements attached to said receiver pocket side means, and said cam follower means includes cam roller means extending from said legs for engagement by said spreader cam means.

5. An improvement according to claim 1 further including sensor means for sensing the presence or absence of articles in the receiver pocket, and actuator means for causing the spreader cam means to be operated so as to spread the receiver pocket side margins apart when the absence of articles in the receiver pocket is sensed.

6. An improvement according to claim 5 wherein said actuator means includes fluid cylinder means for extending and retracting said cam means, and guide means mounted substantially at the top of said apparatus for guiding said spreader cam means toward and away from engagement with the receiver pocket side means.

7. In apparatus for supplying box flats or like articles to a processing device, the apparatus comprising a plurality of carrier pocket devices movable to and away from an article delivery station, and receiver pocket means at the article delivery station, the receiver pocket means including elongate upstanding side support members for retaining received articles, the side support members being at least partly defined by vertical margins confronting the delivery station, the improvement comprising; spreader means for moving the elongate side support member laterally of the receiver pocket means and away from each other thereby spreading the side support members apart from one another to facilitate delivery of articles from the carrier pocket to the receiver pocket means and to prevent damage to the articles during entry into said receiver pocket means; and receiving pocket base means, the base means being movable into the pocket for supporting the articles being delivered into the receiver pocket means, and movable out of the pocket for permitting the delivered articles to descend through and out of the receiver pocket toward the processing device.

8. The improvement according to claim 7 further including sensor means for sensing the presence or absence of articles at the preset location in the receiver pocket, and actuator means for actuating the spreader means and the base means for opening the receiver pocket margins and inserting the base means into the receiver pocket means when the absence of articles is sensed.

9. A method of transferring an effectively endless supply of articles to a processing device from an infeeder, the infeeder including a plurality of carrier pocket devices movable to and away from an article delivery station, and receiver pocket means at the article delivery station, the receiver pocket means including upstanding elongate side support members for retaining received articles, the side support members being at least partly defined by margins confronting the delivery station, and spreader means for moving the elongate side support members laterally away from each other, the method comprising the steps of; locating a carrier pocket carrying articles at the delivery station; actuating said spreader means for the elongate side support members thereby spreading said receiver pocket side support members apart from one another to facilitate passage of the articles into the receiving pocket; locating a base means substantially at lower margins of the receiver pocket means; thereafter urging the articles from the carrier pocket device to the receiver pocket means while maintaining said elongate side support members in the laterally spread position thereby preventing engagement of the articles with said side support members during transfer, which engagement could result in damage to said articles; thereafter moving the receiver pocket side support members toward one another so as to embrace the received articles; and thereafter withdrawing the base means from the receiver pocket so as to permit the received articles to descend through the receiver pocket toward the processing device.

10. A method according to claim 9 including the steps of sensing the absence of articles in the lower portion of the receiving pocket, and, spreading the receiver pocket side margins and locating the base means in the receiver pocket in response to the sensed absence of articles in the receiver pocket.

* * * * *